United States Patent [19]

Lu

[11] Patent Number: 5,820,446
[45] Date of Patent: Oct. 13, 1998

[54] APPARATUS AND METHOD FOR TEXTURING RIGID-DISK SUBSTRATES

[75] Inventor: Peter An Lu, Sunnyvale, Calif.

[73] Assignee: Komag, Incorporated, Milpitas, Calif.

[21] Appl. No.: 660,260

[22] Filed: Jun. 7, 1996

[51] Int. Cl.⁶ .................................................. B24B 21/12
[52] U.S. Cl. .............................. 451/37; 451/59; 451/63; 451/302; 451/307
[58] Field of Search .................................. 451/37, 57, 59, 451/63, 65, 299, 168, 302, 306, 307, 461; 492/30, 33, 40

[56] References Cited

U.S. PATENT DOCUMENTS

| | | | |
|---|---|---|---|
| 2,469,735 | 10/1949 | Lindsay et al. | 451/303 |
| 2,477,602 | 8/1949 | Herchenrider | 451/303 |
| 2,527,554 | 10/1950 | Kimball | 451/303 |
| 2,581,754 | 1/1952 | Cosmos | 451/303 X |
| 2,601,749 | 7/1952 | Johnson | 451/302 |
| 2,723,505 | 11/1955 | Krafft | 451/303 X |
| 4,262,452 | 4/1981 | Lopez | 451/63 |
| 4,617,763 | 10/1986 | Edling | 451/303 X |
| 4,938,129 | 7/1990 | Miciukiewicz et al. | 492/40 X |
| 4,964,242 | 10/1990 | Ruble et al. . | |
| 4,973,496 | 11/1990 | Kruger et al. . | |
| 5,012,618 | 5/1991 | Price et al. | 451/303 X |
| 5,085,010 | 2/1992 | Grau | 451/303 |
| 5,099,615 | 3/1992 | Ruble et al. . | |
| 5,307,593 | 5/1994 | Lucker et al. . | |
| 5,450,181 | 9/1995 | Tsukida et al. | 492/30 X |

FOREIGN PATENT DOCUMENTS

| | | | |
|---|---|---|---|
| 3-3765 | 1/1991 | Japan | 451/63 |
| 482281 | 8/1975 | U.S.S.R. | 451/303 |

*Primary Examiner*—Timothy V. Eley
*Attorney, Agent, or Firm*—Skjerven Morrill MacPherson Franklin & Friel; Thomas S. MacDonald

[57] ABSTRACT

An apparatus for variably texturing a first surface of a rigid-disk substrate having an annular inner recording head-landing zone and an annular outer data zone surrounding the head-landing zone is characterized by a stepped force-exerting cylindrical stepped roller which forces a movable tape having an abrasive containing slurry on its surface to variably texture the zones of the surface of the substrate. A method of variably texturing a surface of a rigid-disc substrate includes the steps of providing a movable abrasive-containing tape between the stepped cylindrical roller and disk substrate to force the tape against the substrate with greater pressure on a head landing zone than on a data zone.

10 Claims, 3 Drawing Sheets

APPARATUS AND METHOD FOR TEXTURING RIGID-DISK SUBSTRATES

FIELD OF THE INVENTION

This invention relates to an apparatus and method of texturing rigid-disk substrates having a thin metal coating. More particularly, the invention is concerned with the variable texturing of both a read-write recording head-landing zone and a data zone on one or both sides of a substrate in the rigid disk manufacturing process.

BACKGROUND OF THE INVENTION

Personal computers have become commonplace and many personal computers contain a rigid memory disk or hard drive. A very popular type of hard drive contains a thin-film metal coated rigid disk as the substrate of the magnetic media. The thin film rigid disks are typically manufactured by electroless nickel plating an aluminum substrate with a metal or with a metal alloy coating such as nickel/phosphorus. The nickel/phosphorus coating is then polished to a very fine, mirror-like finish. After polishing, the nickel/phosphorus coating is textured, followed by the application of a magnetic coating.

The texturing process preferably results in a random pattern of scratches or grooves with sharply defined edges in a substantially circumferential direction relative to the center of the rigid disk.

Various purposes of texturing are described in U.S. Pat. No. 4,973,496. In this patent a roller is forced against a porous tape in the presence of a slurry containing abrasive particles and a disk surface and the roller and tape are oscillated while delivering the slurry liquid to the pressed region. In one embodiment a roller is described limiting the textured area only to a band at a radially inward part of the disk surface. The roller diameter is decreased over an area where texturing is not desired. This provides clearance for free abrasive particles so that they do not texture the radially outward part of the disk surface. No variable texturing of both bands or zones of the disk simultaneously is suggested.

U.S. Pat. 4,964,242 and 5,099,615 also describe systems for texturing the surfaces of rigid disks, generally simultaneously on both sides of the disk. The texturing process is accomplished by utilizing a water slurry of abrasive particles associated with a moving tape or by a film tape coated with abrasive particles which is brought into contact with the disk surfaces. In the latter two patents abrasive tapes with a pair of load roller assemblies are positioned such that the pair of rollers press the slowly moving abrasive tape against opposite surfaces of a rotating rigid disk. Each roller is a cylindrically-shaped metal drum covered with rubber. A liquid lubricant can be added to the water vehicle of the slurry formed at the tape/disk interface. U.S. Pat. No. 5,307,593 describes a moving tape extending across all the annular radius of a rigid disk. In each of these last-mentioned patents texturing is done either across the entire annulus of the disk or on the head-landing zone only. In known practice if the data zone is to be textured with a texture different from the texture desired on the head-landing zone another texturing machine is utilized in another process step.

SUMMARY OF INVENTION

An apparatus for variably texturing a rigid-disk substrate having an annular inner recording head-landing zone and an annular outer data zone surrounding the head-landing zone, is disclosed. A stepped cylindrical roller includes a first cylindrical portion of a first average diameter to force a movable tape against and across the data zone of a rotating disk in the presence of an abrasive-coating slurry and a second cylindrical portion of a second average diameter greater than the first diameter to simultaneously force the tape against and across the head-landing zone for texturing the head-landing zone with a rougher texture than a texture being formed on the data zone. A duplicate tape and stepped roller may be positioned on an opposite side of the disk substrate to duplicate the different textures on the data zone and head-landing zone on the disk's opposite side. In one aspect of the invention a force application device is provided for applying variable forces to each of two spaced annular surfaces of a disk substrate for variably texturing a data zone and a head-landing zone on the substrate.

A method is also provided involving passing an abrasives slurry coated tape transversely over an annular data zone and a spaced annular head-landing zone of a rigid-disk substrate, rotating the disk substrate, and forcedly moving a stepped cylindrical rotating roller against the tape to force a first portion of the stepped roller against the tape and the substrate data zone and to force a second portion of the stepped roller against the tape and the substrate head-landing zone, the second portion of the roller having a greater diameter than the first portion of the roller so as to texture the head-landing zone with a rougher texture than the data zone.

DETAILED DESCRIPTION

Figure 1:
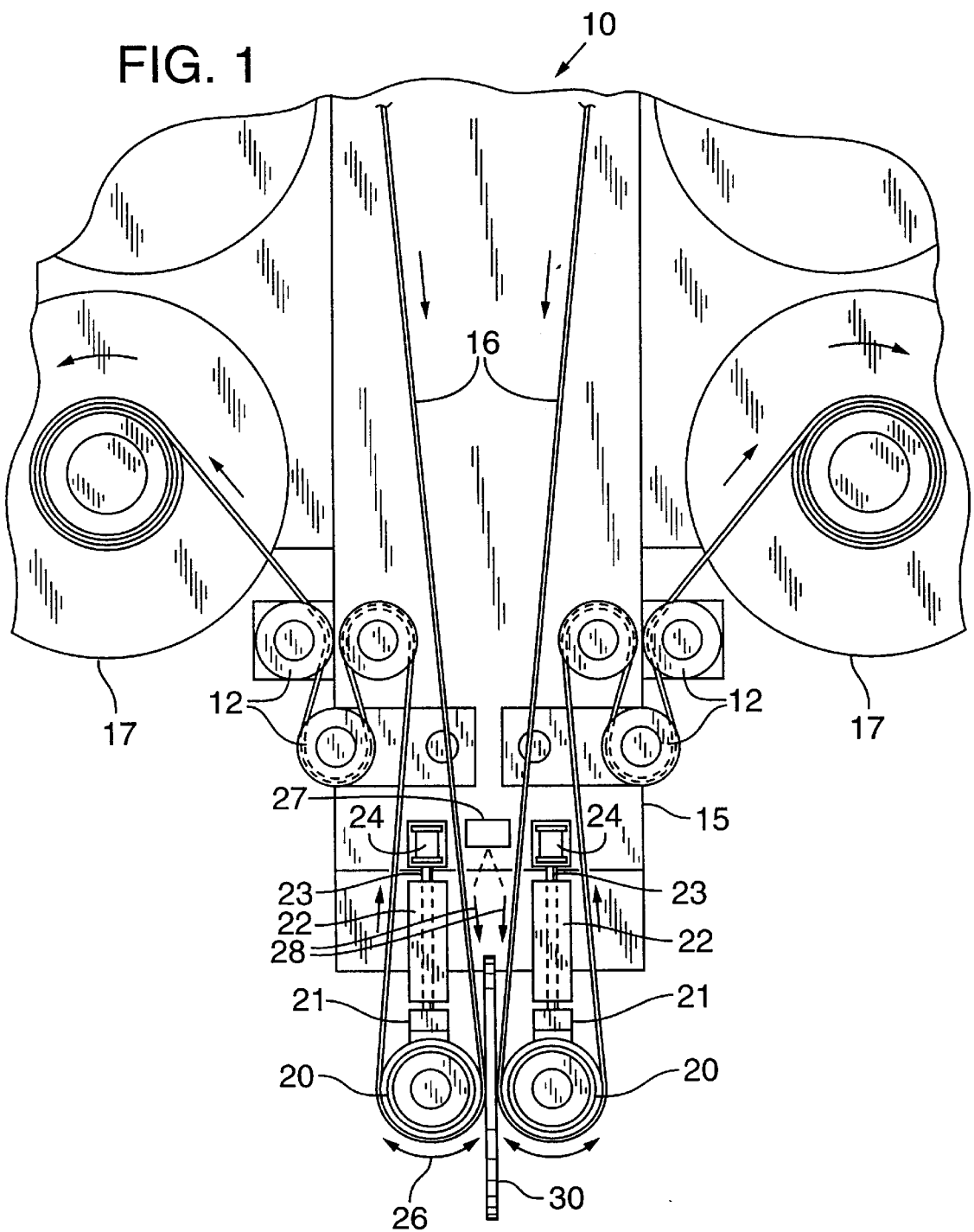
FIG. 1 is a front view of the tape transport mechanism showing a pair of stepped rollers forced against opposite sides of a rigid-disk substrate.

FIG. 1 shows a tape transport system 10 in which the invention may be used. The system comprises a pair of tape guides 12 around which a pair of tapes 16 are guided. The tapes are taken up by a pair of takeup reels 17 which are driven by a tape drive motor (not shown). The motor typically turns at a rate such that approximately 2 inches (5.08 cm) of tape are passed over load rollers 20, per each minute. During texturing of a series of the workpieces 30, typically rigid disk substrates, hundreds of feet or meters of tape will be transferred from a supply reel (not shown) to the tape guides 12 and to the takeup reels 17. The arrows in FIG. 1 denote the direction that the tape is traversing during the texturing process. Each of the load rollers 20 is mounted on an L-shaped bracket 21 with one end of the bracket mounting an end of a cylindrically shaped load roller 20. The particular shape and support for the rollers may be modified without departing from the scope of the present invention. The bracket 21 is typically attached to a pivot block 22 which is attached to a chassis 15. During processing or texturing the load rollers 20 press tape 16 against the front and back surfaces of the rotating disk substrate 30. A shaft 23 is rigidly attached to one end of bracket 21 while the other end extends through the interior of the pivot block 22 where it is eventually terminated by drum 24. A steel band (not shown) is wrapped around the drum and causes a rotational force to be applied to the drum which is translated to the shaft 23. This allows the bracket 21, shaft 23 and drum 24 to act in unison. The rotational movement applied to the drum will be transferred directly to the L bracket 21 and thereby to adjust the parallelism of the rollers to the disk. The rollers are movable about an arc as indicated by arrows 26 into and out of forcing positions as controlled by a carriage (not shown). Reference is made to FIG. 8 and accompanying description in U.S. Pat. No. 4,964,242 showing a carriage or platform 50 which may be used. A source 27 of liquid slurry containing abrasive particles is mounted within the nip of the two tapes so as to spray the abrasives-containing slurry between the tape and the substrate as indicated by arrows 28. The tapes then containing the slurry causes striations or grooves to be formed on the two distinct annular parts on each side of the disk substrate so as to provide the desired simultaneous differential texturing of the two zones on each of sides of the substrate. Further details of this transport system are seen in U.S. Pat. No. 4,964,242, the disclosures therein being incorporated herein by reference. This transport system reference, without a stepped roller, is seen in Model EDC 1800 available from Exclusive Design Company of Fremont, Calif.

Figure 2:
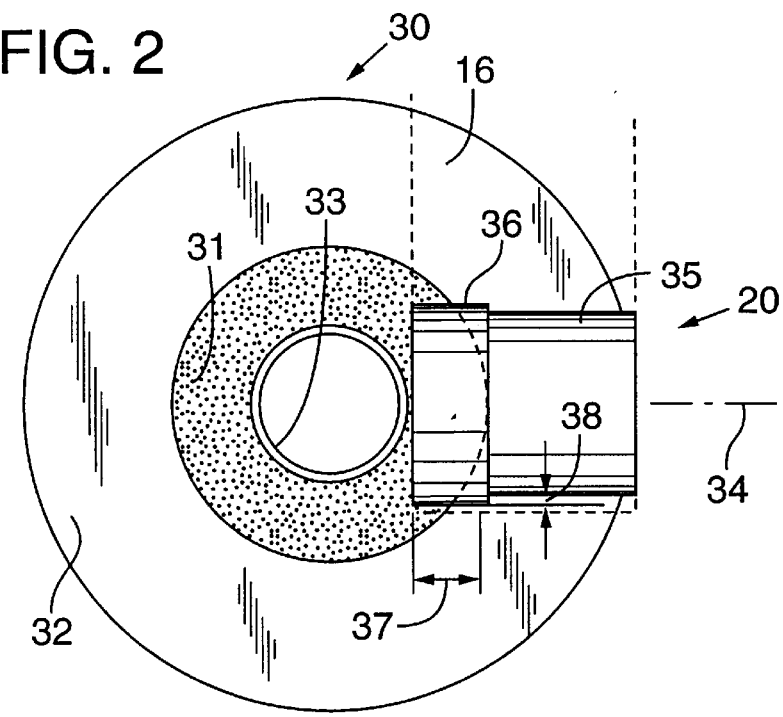
FIG. 2 is a schematic side view of a stepped roller in forcing position against a respective data zone and head-landing zone of the substrate.
Figure 3:
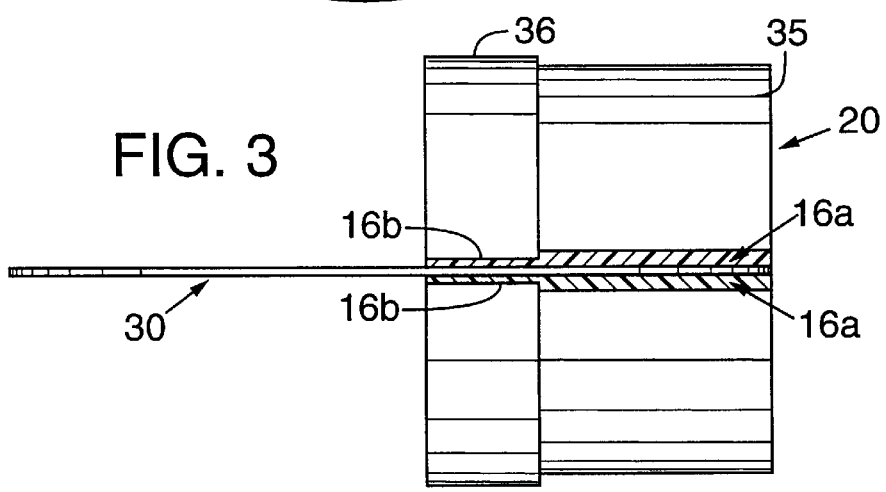
FIG. 3 is a schematic top view thereof.
Figure 4:
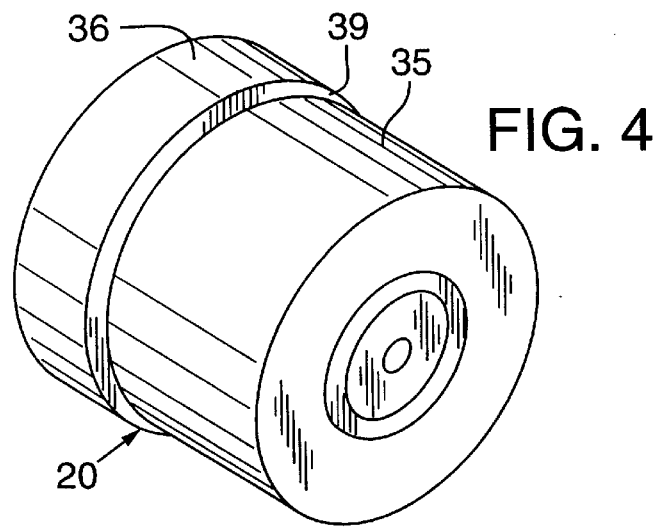
FIG. 4 is a perspective view of the roller per se.

FIG. 2 shows schematically a disk substrate 30 having an annular head-landing zone 31 and an annular data zone 32. The disk 30 further includes a central aperture 33 which is eventually utilized to mount the completed disk in a disk drive (not shown). Tape 16 is shown by dashed lines and extends between the disk recording head landing zone and the data zone and a roller 20 is rotatable transverse to the two zones and radially of the disk 30, i.e. the roller has a rotational axis 34 along a radius of the disk substrate in forcing position. The roller 20 comprises a stepped roller having a first portion 35 which transversely overlies and has a width which extends radially of the data zone annulus 32. The stepped roller 20 further includes an integral second portion 36 of a greater average diameter than the first portion 35 which generally overlies the head-landing zone 31 of the disk substrate, also having a width extending along a radius of the disk substrate. As seen in FIG. 3 the stepped roller(s) exert forces which result in a differential compression of the tape 16 so that a larger force is exerted on the head landing zone 31 than the force exerted on the data zone 32. The amount of force dictates the degree of texturing or surface roughness which is imparted simultaneously on the respective zones. Due to the higher force on the head landing zone 31 the resulting surface on the head landing zone is rougher than the textured surface on the data zone 32. The actual axial length 37 of the first portion of the step roller 36 is essentially the annular width of the head-landing zone. The compression of the tape 16 is shown in more detail in FIG. 3 where the less highly compressed tape is designated by the numeral 16a and the more compressed tape (due to the greater diameter of the portion 36 of the stepped roller) is designated by the numeral 16b. The overall stepped roller is seen in FIG. 4 which particularly shows a sharp 90° step 39 between the portion 35 and the portion 36 of the step roller. The step height 38 is also clearly shown in FIG. 2. The step heights in FIGS. 2–4 are exaggerated and are not-to-scale. The higher tape compression caused by portion 36 may also be designated as the "high pressure" portion causing the rougher texture while a "low pressure" portion is provided at portion 35 of the stepped roller 20, creating a relatively lower pressure and thus a less rough texture to the data zone 32.

Figure 5:
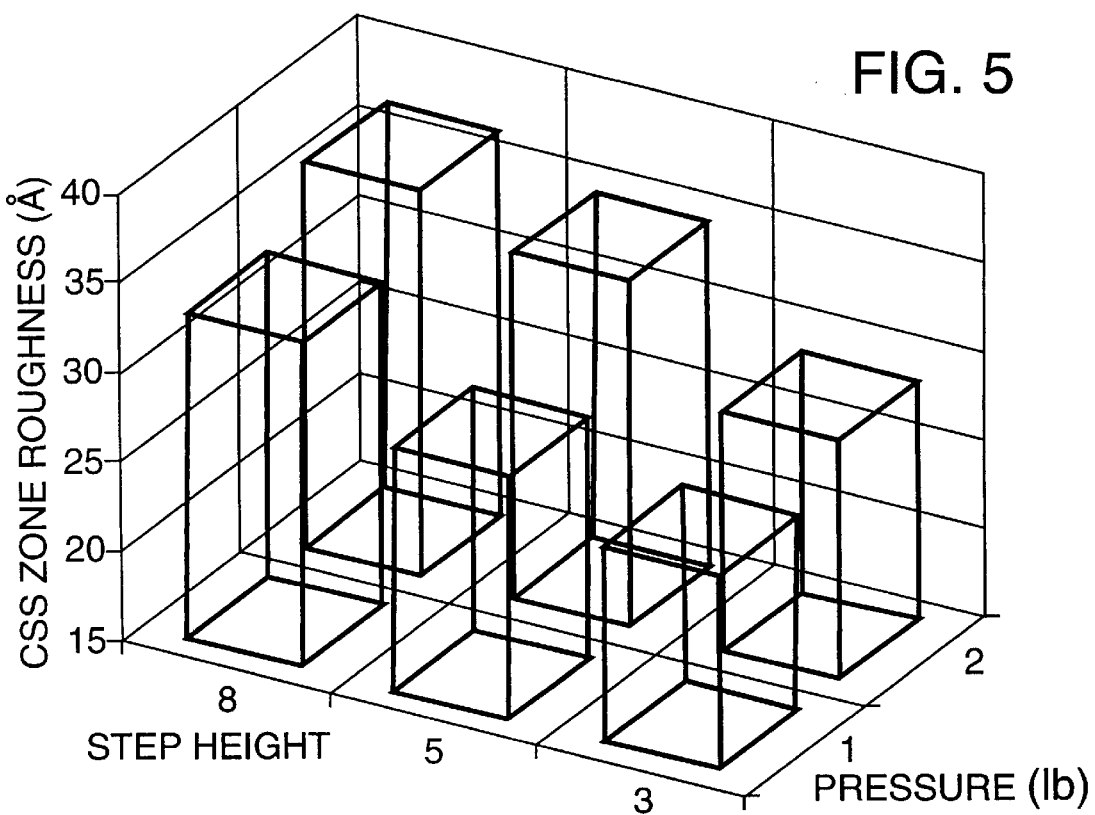
FIG. 5 is a cylindrical three-dimensional representation of a typical step height, data zone roughness and forcing pressure chart representing a range of such parameters.
Figure 6:
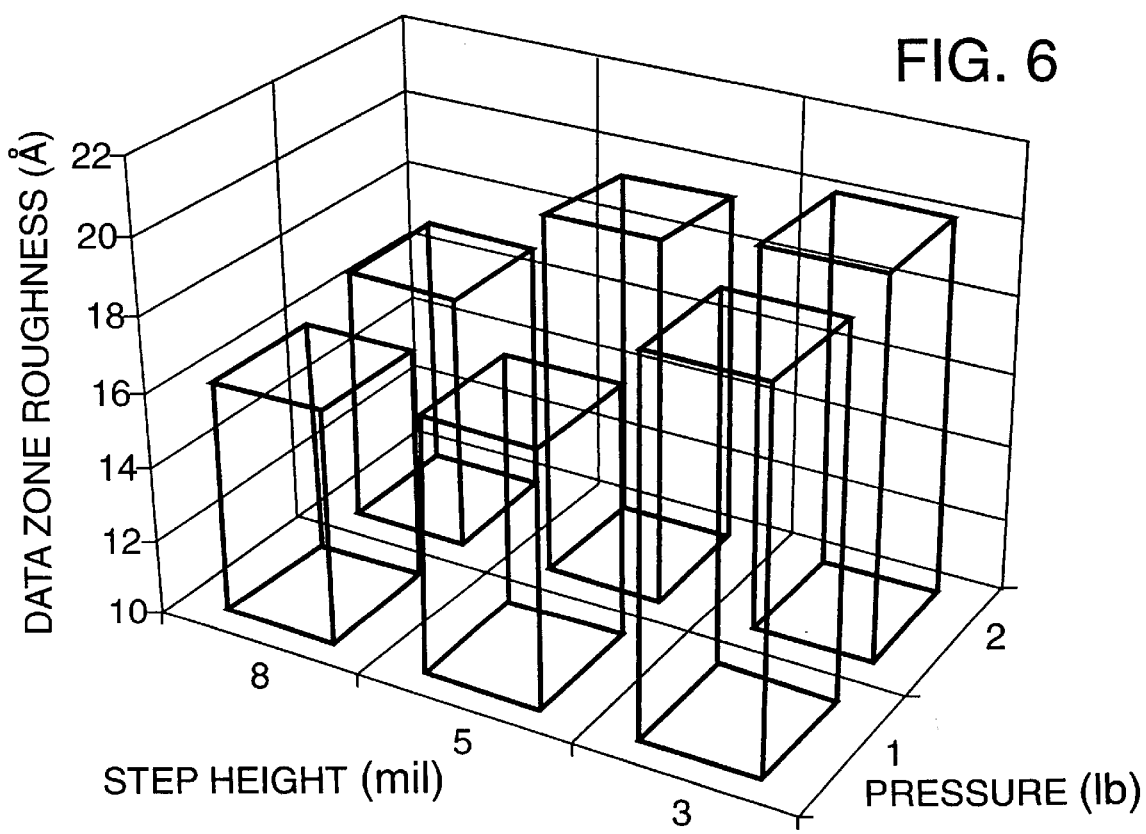
FIG. 6 is a graphical representation of step height, head-landing zone and forcing pressure chart also representing a range of such parameters.

The chart seen in FIG. 5 illustrates the various data zone roughness averages in angstroms resulting from particular step heights 38 on the step rollers for particular forces expressed in pounds. The step heights are in mils. Typical forces of one or two pounds for a particular sized substrate and at the particular step heights of 3, 5 or 8 mils results in a range of average roughness Ra from about 15 angstroms to about 21 angstroms, dependent on the abrasive particle size, the tape utilized, the step height and the force being applied by the roller portion 35 to the tape and to the particular data zone of the rigid disk substrate. A similar roughness chart is seen in FIG. 6, similarly for forces of 1 to 2 pounds at step heights of 3, 5 and 8 mils, which result in surface roughnesses on the head-landing zone of from about 18 angstroms to about 36 angstroms.

In typical applications the step heights may be from about 0.0015 to about 0.0060 inches (0.038–0.15 mm). On a typical product the tape moves one-half inch (1.27 cm) in 18 seconds. The range of forces which may be exerted on the tape with particular step heights is from about 1 pound to 5 pounds. The roller nominal diameter for the Model 1800 machine is about two inches (5.08 cm).

The texture tape preferred is TAPE-TECH™ X011 or X012 tape of about 2" (5.08 mm) width for a 95 mm disk utilizing the Model 1800 machine, which is a line of finishing tapes where the latter includes resilient nylon fibers with a length-to-denier ratio that is conducive to maintaining integrity and abrasion resistance. The tape has a tightly woven backside for proper slurry management and effectiveness. The fiber is a Nylon 6.6 fiber having a denier of 1.0 with a fiber length of about 0.029 inches and a total weight of about 6.6 oz./yd.$^2$. It has a tensile strength of about greater than 30 pounds and a tear strength in excess of 1.5 pounds and withstands at least 500 cycles of operation. Model X011 tape is comprised of soft very low denier (1.0) absorbent rayon and is particularly effective when a speedy application of slurry is important. The tapes are available from High-Tech Conversions, Inc., Springfield, Mass. The slurry used is normally a water slurry of aluminum oxide or diamond having a minimum and maximum particle size of from about 0.5 microns to about 5 microns. The slurry is fed to the tape and the disk at about 0.25 grams per second and may contain about 10% by weight of a lubrication agent such as 65Y available from Mipox of Japan.

As set forth above, the step roller generates different pressures on the disk surface due to the diameter differences on the step roller and therefore allows for a sharp disk surface roughness change along its radial direction. Disks of this invention require a rougher surface at the head landing zone for lower stiction, i.e. friction that tends to prevent relative motion between two movable parts at their null position, and a smoother surface at the data zone for better magnetic performance. By using the step roller of this invention, disks can be made with a sharp surface roughness change between the head-landing zone and the data zones in one process step. The disk with data zone roughness and a head-landing zone of greater roughness or at a different relative location, can also be achieved by changing the roller step height and step width to fit the requirements of a particular desired disk substrate product. The use of a single process for simultaneously texturing different roughness levels on the data zone and head-landing zone of a disk will decrease costs and process variations since those operations by this invention are done simultaneously either on one side of the disk or, as shown in FIG. 1, simultaneously on both sides of the disk substrate.

The above description of embodiments of this invention is intended to be illustrative and not limiting. Other embodiments of this invention will be obvious to those skilled in the art in view of the above disclosure. For example, the disk head landing zone may be at the disk OD rather than the ID. Further, the individual zones may be prepared using tapered surfaces in each step of the roller, the tapered surfaces resulting from manufacturing tolerances or by design.

I claim:

1. A method of variably texturing a surface of a rigid-disc substrate having an annular inner recording head-landing zone and an annular outer data zone surrounding the head-landing zone, said method comprising:

providing a means for rotating the substrate in a fixed plane;

providing a movable tape;

passing said tape transversely across said zones;

providing a stepped cylindrical roller having a first cylindrical portion of an average first diameter and a second cylindrical portion of an average second diameter greater than said first diameter;

orienting and forcedly moving said roller against said tape in the presence of an abrasives-containing slurry to force said first cylindrical portion against said tape and to force said tape transversely against the data zone and to simultaneously force said second cylindrical portion transversely against said tape and to force said tape transversely against the head-landing zone;

rotating the substrate; and wherein the head-landing zone and data zone are simultaneously textured such that the head-landing zone has a rougher texture than a texture of the data zone.

2. The method of claim 1 wherein a force exerted by said second cylindrical portion against the head-landing zone is greater than the force exerted by said first cylindrical portion against the data zone.

3. The method of claim 1 wherein the said second diameter is from about 0.0015 inches to about 0.0060 inches greater than the first diameter.

4. The method of claim 1 wherein a width of said first cylindrical portion is at least as wide as a transverse width of said data zone and a width of said second cylindrical portion is at least as wide as a transverse width of said head-landing zone.

5. The method of claim 1 wherein the steps of providing a stepped roller and a movable tape, supplying an abrasives-containing slurry, passing the tape across the zones, orienting and forcedly moving, and wherein the zones are simultaneously textured are performed simultaneously on an opposed surface of said substrate.

6. An apparatus for variably texturing a first surface of a rigid substrate having an annular inner recording head-landing zone and an annular outer data zone surrounding the head-landing zone, said apparatus comprising:

a chassis;

a rotation means for rotating the substrate in a fixed plane relative to the chassis;

at least one force-exerting cylindrical roller positionable to texture the surface of the substrate;

a movable tape having a width at least as wide as the combined width of the head-landing zone and the data zone;

means for supplying an abrasive-containing slurry to said tape;

means for passing said tape between said roller and the surface of the substrate; and wherein said cylindrical roller is a stepped roller including a first cylindrical portion of an average first diameter adapted to force the tape against the substrate surface across the data zone and a second cylindrical portion of an average second diameter greater than the first diameter adapted to simultaneously force said tape against the substrate surface across the head-landing zone for texturing the head-landing zone with a rougher texture than a texture of said data zone.

7. The apparatus of claim 6 wherein said rigid-disc substrate has a second opposite surface having a second head-landing zone and a second data zone, said apparatus further comprising a second force-exerting cylindrical stepped roller and a second movable tape to texture said second opposite surface of the substrate such that the second head-landing zone has a rougher texture than a texture of said second data zone.

8. The apparatus of claim 6 wherein the said second diameter is from about 0.0015 inches to about 0.0060 inches greater than the first diameter.

9. The apparatus of claim 6, wherein a width of said first cylindrical portion is at least as wide as a transverse width of said data zone and a width of said second cylindrical portion is at least as wide as a transverse width of said head-landing zone.

10. The apparatus of claim 6 including a junction between said roller first cylindrical portion and said roller second cylindrical portion, said junction comprising a 90° step such that a sharp change in surface texture roughness occurs at said junction and between the head-landing zone and data zone.

* * * * *